США005432502A

United States Patent [19]

Johnson, Jr.

[11] Patent Number: 5,432,502

[45] Date of Patent: Jul. 11, 1995

[54] METHOD AND APPARATUS FOR MONITORING SIGNALS FROM TRANSDUCERS AND OPTICAL ENCODERS

[75] Inventor: Harold L. Johnson, Jr., Pauline, S.C.

[73] Assignee: Milliken Research Corporation, Spartanburg, S.C.

[21] Appl. No.: 92,121

[22] Filed: Jul. 15, 1993

[51] Int. Cl.⁶ .............................................. G08B 21/00
[52] U.S. Cl. .................................... 340/671; 340/677
[58] Field of Search .................. 340/146.2, 671, 677, 340/825.57–825.69, 670, 672; 377/39; 28/187

[56] References Cited

U.S. PATENT DOCUMENTS

| | | | |
|---|---|---|---|
| 3,739,276 | 6/1973 | Dornberger | 340/677 |
| 4,007,492 | 2/1977 | Rose | 340/671 |
| 4,063,112 | 12/1977 | Dumbeck | 340/671 |
| 4,125,295 | 11/1978 | Ruhnau et al. | 340/671 |
| 4,195,291 | 3/1980 | Burks, Jr. | 340/671 |
| 4,196,629 | 4/1980 | Philips | 73/593 |
| 4,320,662 | 3/1982 | Schaub et al. | 73/660 |
| 4,876,527 | 10/1989 | Oka et al. | 340/671 |
| 4,876,528 | 10/1989 | Walker et al. | 340/671 |
| 4,967,075 | 10/1990 | Borden | 250/237 |
| 5,103,213 | 4/1992 | Marsh et al. | 340/671 |
| 5,130,933 | 7/1992 | Kitano | 364/487 |
| 5,138,564 | 8/1992 | de Jong et al. | 364/571.04 |

Primary Examiner—Edward L. Coles, Sr.
Assistant Examiner—Fan Lee
Attorney, Agent, or Firm—Kevin M. Kercher; Terry T. Moyer

[57] ABSTRACT

An apparatus and method for monitoring the incoming transducer signal or synchronizing signal from an optical encoder in real time and display the degree of stability. The incoming transducer signal or optical encoder signal comprises of a certain number of voltage pulses. The number of pulses for a set period of time is measured to develop an actual frequency of voltage pulses per set unit of time. Furthermore, a representative numerical value for the time between two adjacent pulses is also developed. This time between adjacent pulses is altered by means of a look-up table to develop an average pulse frequency for that same set period of time. The average value for this period of time is then compared against the actual frequency of voltage pulses per set period of time. This comparative value can then be outputted to a display.

44 Claims, 2 Drawing Sheets

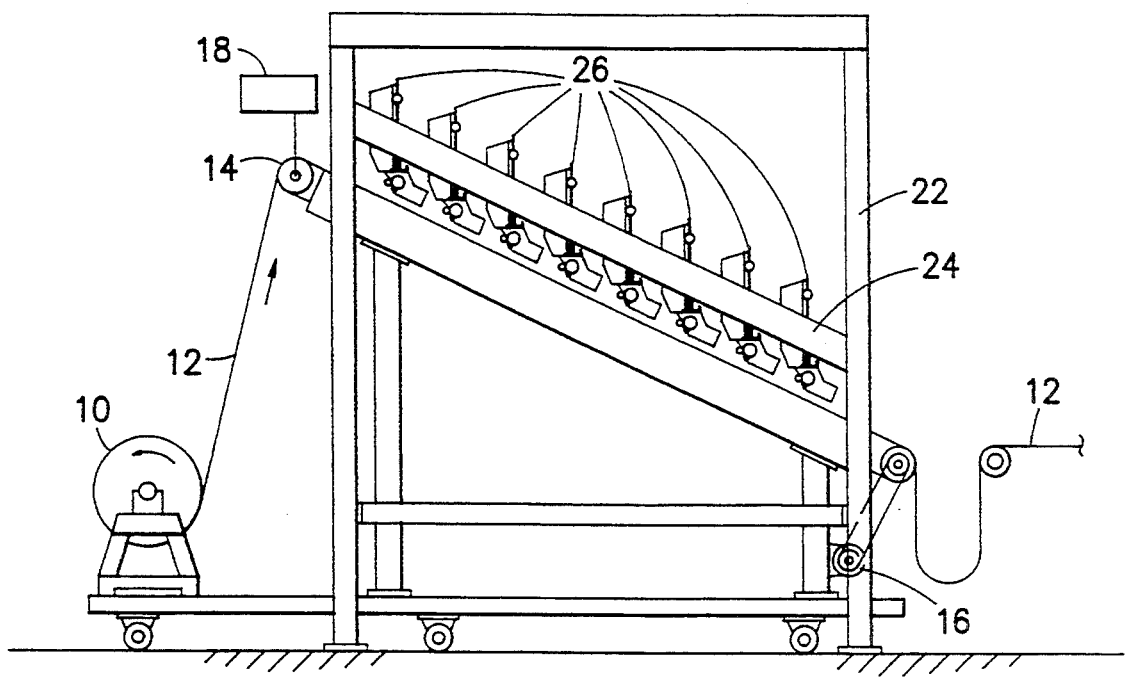
FIG. —1—

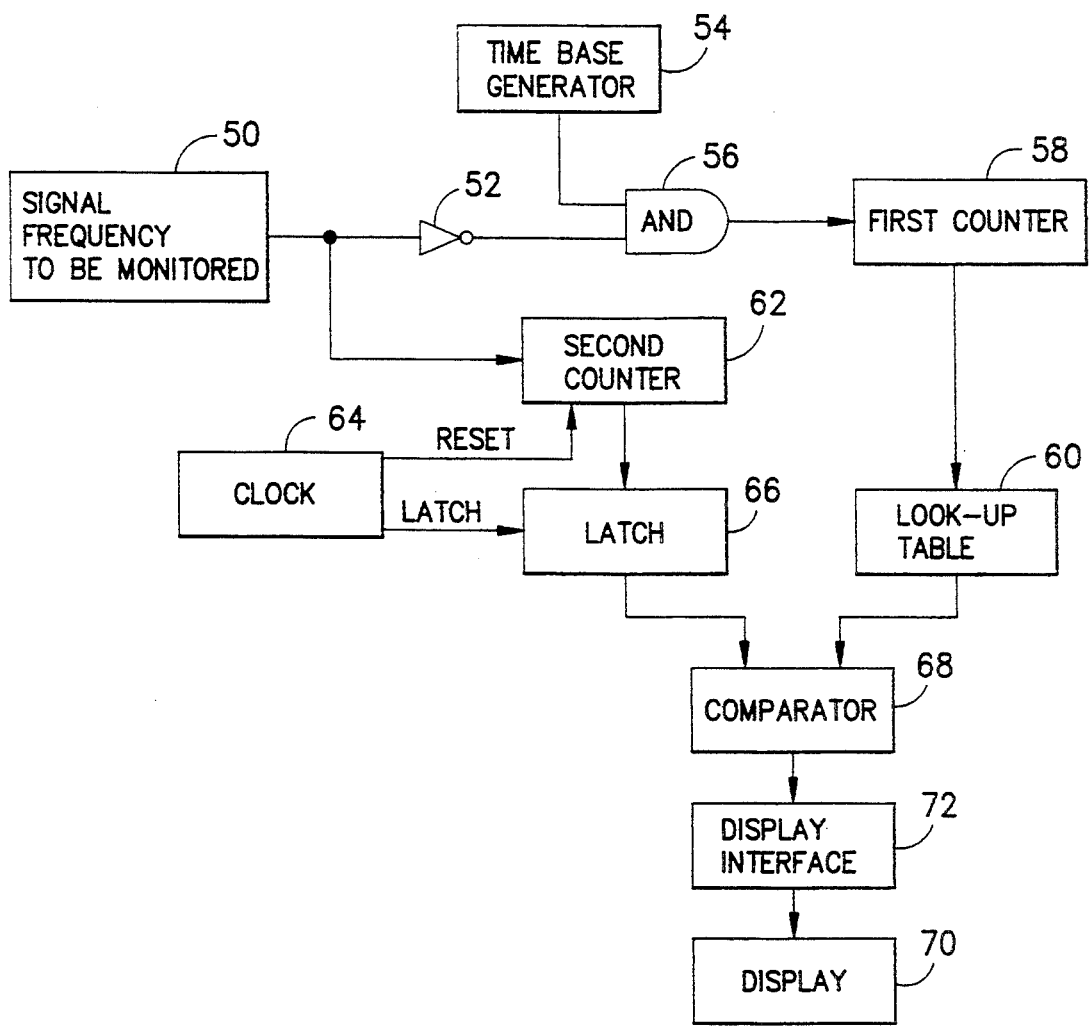
FIG. -2-
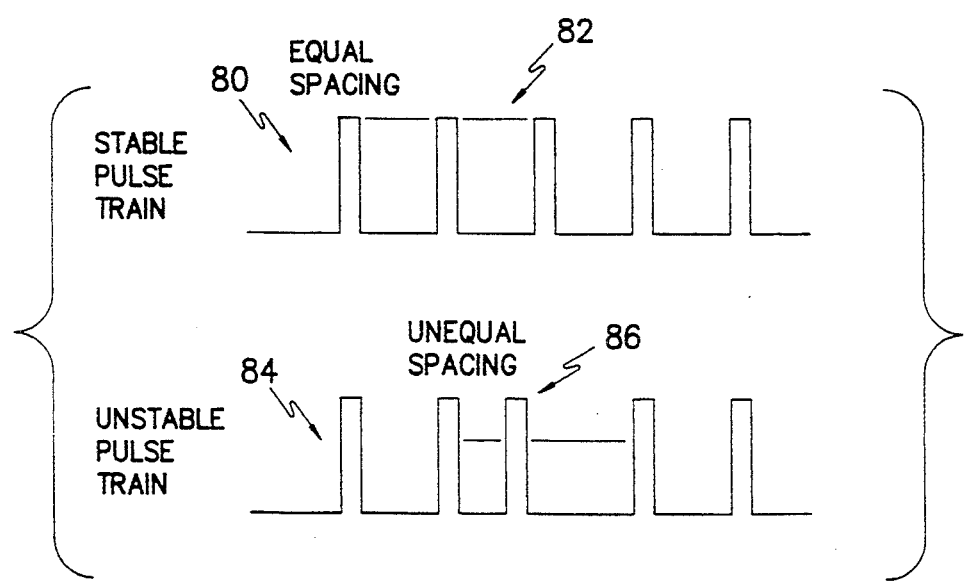
FIG. -3-

5,432,502

METHOD AND APPARATUS FOR MONITORING SIGNALS FROM TRANSDUCERS AND OPTICAL ENCODERS

BACKGROUND OF THE INVENTION

This invention relates to a method and apparatus for monitoring the incoming transducer signal or synchronizing signal from an optical encoder. Both the optical encoder and transducer convert motion into incremental electrical pulses. Control signals then respond to each pulse thereby regulating a motor or some other electrical mechanism. A major problem encountered is sometimes the encoder or transducer signal is erratic or unstable due to mechanical problems with the mechanisms associated with the control system. This unstable condition may be intermittent, occurring only occasionally or it may occur constantly. One example of a possible cause of this instability is a bad bearing in a drive system. Since the control system is linked to the encoder and/or transducer system, it provides responses in a slightly erratic manner. In the past, the only solution was to monitor this pulse with an oscilloscope and hope to catch the instability at the right point in time. A long felt need in the control system industry is to develop a system to monitor the transducer/optical encoder pulse train in real time and display the degree of stability. The system could then monitor the pulse train one hundred (100%) percent of the time to catch problems before they could become serious.

The present invention solves this problem in a manner not disclosed in the known prior art.

SUMMARY OF THE INVENTION

An apparatus and method for monitoring the incoming transducer signal or synchronizing signal from an optical encoder in real time and display the degree of stability. The incoming transducer signal or optical encoder signal comprises of a certain number of voltage pulses. The number of pulses for a set period of time is measured to develop an actual frequency of voltage pulses per set unit of time. Furthermore, a representative numerical value for the time between two adjacent pulses is also developed. This time between adjacent pulses is altered by means of a look-up table to develop an average pulse frequency for that same set period of time. The average value for this period of time is then compared against the actual frequency of voltage pulses per set period of time. This comparative value can then outputted to a display.

It is an advantage of this invention to be able to diagnose intermittent problems with a motorized drive mechanism and/or associated control system.

Still another advantage of this invention is that problems with either a motorized drive mechanism and/or associated control system may be diagnosed prior to when they become serious resulting in a loss of production.

Still another advantage to this invention is that this system is far more accurate than monitoring with an oscilloscope or similar test instrument due to the fact that data is accumulated for each pulse so that if only one transducer and/or optical encoder voltage pulse out of thousands is out of tolerance, it will be diagnosed and displayed.

Another advantage of this invention is that you can determine whether or not transducer and/or optical encoder pulses fall within a certain percentage of the calculated speed baseline so that actual quality standards may be developed.

These and other advantages will be in part apparent and in part pointed out below.

BRIEF DESCRIPTION OF THE DRAWINGS

The above as well as other objects of the invention will become more apparent from the following detailed description of the preferred embodiments of the invention when taken together with accompanying drawings, in which:

FIG. 1 represents a diagrammatic side view of a motorized conveyor of the type for which the instant invention may be adapted;

FIG. 2 is a block diagram disclosing, in overview, the novel stability monitor for monitoring transducer and/or synchronizing signal from the optical encoder disclosed herein; and FIG. 3 is a comparative diagram of a stable pulse train and an unstable pulse train.

DETAILED DESCRIPTION OF THE PREFERRED EMBODIMENT

Referring now to the accompanying drawings, and initially to FIG. 1, which shows an illustrative example of a motorized drive mechanism that is operated by a control system. Any of a wide variety of motorized drive mechanisms and control systems may be monitored by Applicant's invention and the depiction in FIG. 1 is merely one illustrative example. FIG. 1 depicts, in a side elevation view, a set of eight individual arrays or liquid jet gun bars 26 positioned within frame 22. These liquid jet gunbars 26 form part of a pattern dyeing machine. Each liquid jet gunbar 26 is comprised of a plurality of dye jets, aranged in spaced alignment, which extend generally above and across the width of substrate 12 and are suitably supported at their ends by attachment to diagonal frame members (one of which, 24, is shown) on either side of the conveyor 14. Substrate 12 is supplied by roll 10 and is transported in turn under liquid jet gunbar 26 by conveyor 14 driven by a suitable motor indicated generally at 16. There is a pattern control system which operates solenoid valves within the liquid jet gunbar 26 to pattern the substrate 12. Patterned information is transmitted at appropriate times in response to movement by conveyor 14 that is detected by suitable rotary motion sensor transducer means 18 operably associated with the conveyer 14 and connected to a pattern control system. Details of one means to perform this function may be found in commonly assigned U.S. Pat. No. 4,033,154, issued Jul. 5, 1977, which disclosure is hereby incorporated by reference. Other commonly assigned patents relating to pattern dyeing of substrates are as follows: U.S. Pat. Nos. 5,159,824 issued Nov. 3, 1992; 5,128,876 issued Jul. 7, 1992; 5,142,481 issued Aug. 25, 1992; 4,984,169 issued Jan. 8, 1991; 5,136,520 issued Aug. 4, 1992; 5,140,686 issued Aug. 18, 1992; 5,208,592 issued May 4, 1993; 5,161,395 issued Nov. 10, 1992, all of which disclosures are hereby incorporated by reference.

Transducers or optical encoders convert motion into incremental electrical pulses. Control systems then respond to each pulse to control some aspect of a motorized drive mechanism. This aspect may be velocity, acceleration, movement, torque, and so forth. The optical encoder or transducer used in conveyer systems synchronizes the movement of the transport to the electronic control system with the encoder and/or transducer converting transport movement into incremental electrical pulses. The control system can then respond to each pulse to provide a programmed response. A serious problem encountered is that sometimes the encoder and/or transducer signal is slightly erratic or unstable due to mechanical problems with the drive mechanism or problems associated with the motor control system. This unstable condition may be intermittent and occur occasionally or it may occur constantly. One example of the possible causes of this instability is a bad bearing in the motorized drive mechanism such as that shown by numeral 16 in FIG. 1. If there is some problem with the motorized drive mechanism, the control system will also provide erratic control since it is directly linked into the motorized drive mechanism. With a patterning or dyeing system as shown in FIG. 1, this translates into significant quality problems when patterning a substrate with dye. Previously, the only way to observe a problem was to monitor the pulse train with an oscilloscope and hope to catch the instability at a particular point in time. This implies that there will be a certain amount of off-quality product produced prior to awareness of the problem. The solution is to develop a system to monitor the transducer/optical encoder pulse train in real time and display the degrees of stability. The system could monitor the pulse train one hundred (100%) percent of the time to catch problems before they become serious, therefore providing a means of quality control as well as enabling preventative maintenance.

Referring now to FIG. 2, the transducer and/or optical encoder signal frequency to be monitored is indicated by numeral 50. This signal is initially inverted by inverter 52. A non-limiting example of inverters of this type would include 74HC04. The inverted transducer or optical encoder signal is then inputted to an AND Gate 56. A non-limiting example of an AND gate of this type would include 74HC08. There is an additional input to AND Gate 56 which is coupled to a time-based generator 54. This time-based generator 54 is essentially a clock. A non-limiting example of time-based generators of this type would include a crystal clock oscillator such as Vectron ® C0231. This time-based generator 54 provides a signal with a specific frequency. The output of AND Gate 56 is inputted into a first counter 58. A non-limited example of counters of this type would include 74HC4040. Therefore, since the signal frequency to be monitored 50 is inverted so that the only time a logical "zero" appears is when there was previously a positive pulse in the original transducer or optical encoder signal. Therefore, the first counter 58 will add the voltage pulses produced by the time-based generator 54 until the next logical "zero" of the inverted signal frequency to be monitored, which was originally a pulse in the signal frequency to be monitored 50 is received. This will thereby reset the first counter 58 to zero. Therefore, first counter 58 will develop digital numbers which relate to the time period between adjacent pulses in the transducer or optical encoder signal. The signal frequency to be monitored 50 also is inputted into a second counter 62. Non-limiting example of counters of this type would include 74HC4040. This second counter 62 adds up all of the pulses in a signal frequency of an optical encoder or transducer to be monitored 50. There is a clock 64 which resets second counter 62 after a set period of time. Although this set period may vary greatly, the preferred range of time would be between four and ten seconds. A non-limiting example of clocks of this type would include a digital timer such as Vectron ® C0231 that is divided down by counters such as 74HC44 (not shown). Clock 64 also provides a latch signal to latch 66. A non-limiting example of latches of this type would include 74HC273. Therefore, second counter 62 adds up all of the pulses in the signal frequency of the transducer or optical encoder for a set period of time and then sends that digital number to latch 66. The counter 62 is then reset by clock 64 and the process begins again for that same set period of time. This, therefore, provides a numerical value for the number of pulses of the transducer or optical encoder for a set period of time. This value in latch 66 is compared against the time between adjacent pulses outputted by first counter 58. However, before a comparison can be made, the output from first counter 58 must be transformed by means of look-up table 60 into an equivalent and comparative value for that same set period of time, e.g., four to ten seconds. A non-limiting example of look-up tables of this type would include 27C128. Look-up table 60 takes a numerical value that represents the time between encoder or transducer pulses and extrapolates that for the same set period of time that clock 64 operates under. Therefore, if clock 64 is set for ten seconds, look-up table 60 will be able to translate a frequency pulse representing the time between encoder or transducer pulses and translate that to a specific number of pulses per ten second period of time. The output of look-up table 60 is then compared with the value of latch 66 by comparator 68. A non-limiting example of comparators of this type would include 74HC85. This information is then inputted to a display interface 72 and then to a display 70. An example of a display 70 would include a series of light emitting diodes. A non-limiting example of light emitting diodes include 521-9165 manufactured by Dialight, Incorporated located at 203 Harrison Place, Brooklyn, N.Y. 11237. Please keep in mind that specific components represented by FIG. 2 and described above are merely for illustration and there are numerous means to electronically achieve the same results. Furthermore, the function of display 70 can be done by numerous means including cathode ray tube display, liquid crystal display, electroluminescent plasma display, among others. Virtually any means of displaying digital data may be utilized.

FIG. 3 depicts a stable encoder or transducer pulse train as generally indicated by numeral 80. The actual equal spacing is reflected by numeral 82. FIG. 3 also shows an unstable pulse train generally designated by numeral 84 in which numeral 86 reflects the unequal spacing between adjacent optical encoder or transducer pulses.

It is now very apparent from the above that this invention can be applied to virtually all motorized drive mechanisms that are controlled by some type of control system with one typical, merely illustrative application being that of a conveyer.

In view of the above, it will be seen that various aspects and features of the invention are achieved and other advantageous results attained. While a preferred embodiment of the invention has been shown and described, it will be clear to those skilled in the art that changes and modifications may be made therein without departure from the invention in its broader aspect.

What is claimed:

1. A system for monitoring transducer signal pulses of a transducer comprising:
   (a) a first means for generating a time period between adjacent pulses in a transducer signal;
   (b) a second means for transforming said time period between adjacent pulses in a transducer signal, into an average transducer pulse frequency that represents transducer signal pulses for a period of time;
   (c) a third means for adding transducer signal pulses for said period of time to generate an actual transducer pulse frequency; and
   (d) a fourth means for comparing said average transducer pulse frequency with said actual transducer pulse frequency to diagnose intermittent problems with said transducer.

2. A system for monitoring transducer signal pulses of a transducer as defined in claim 1, further comprising of a fifth means to electronically display the result of the comparison of said average transducer pulse frequency and said actual transducer pulse frequency.

3. A system for monitoring transducer signal pulses of a transducer as defined in claim 2, wherein said fifth means to electronically display said comparison of said average transducer pulse frequency and said actual transducer pulse frequency includes a digital display interface and a digital display device.

4. A system for monitoring transducer signal pulses of a transducer as defined in claim 3, wherein said digital display device includes a cathode ray tube.

5. A system for monitoring transducer signal pulses of a transducer as defined in claim 3, wherein said digital display device includes a liquid crystal display.

6. A system for monitoring transducer signal pulses of a transducer as defined in claim 3, wherein said digital display device includes an electroluminiscent display.

7. A system for monitoring transducer signal pulses of a transducer as defined in claim 3, wherein said digital display device includes a plasma display.

8. A system for monitoring transducer signal pulses of a transducer as defined in claim 3, wherein said digital display device includes a light emitting diode.

9. A system for monitoring transducer signal pulses of a transducer as defined in claim 1, wherein said second means for transforming said time period between adjacent pulses in a transducer signal into an average transducer pulse frequency that represents transducer signal pulses for a period of time includes a look-up table.

10. A system for monitoring transducer signal pulses of a transducer as defined in claim 1, wherein said first means for generating a a time period between adjacent pulses in a transducer signal includes a counter.

11. A system for monitoring transducer signal pulses of a transducer as defined in claim 1, wherein said first means for generating a a time period between adjacent pulses in a transducer signal includes a time base generator.

12. A system for monitoring transducer signal pulses of a transducer as defined in claim 1, wherein said third means for adding transducer signal pulses for said period of time to generate an actual transducer pulse frequency includes a counter.

13. A system for monitoring transducer signal pulses of a transducer as defined in claim 1, wherein said third means for adding transducer signal pulses for said period of time to generate an actual transducer pulse frequency includes a clock.

14. A system for monitoring transducer signal pulses of a transducer as defined in claim 1, wherein said third means for adding transducer signal pulses for said period of time to generate an actual transducer pulse frequency includes a latch.

15. A system for monitoring transducer signal pulses of a transducer as defined in claim 1, wherein said first means for generating a time period between adjacent pulses in a transducer signal includes an AND gate.

16. A system for monitoring transducer signal pulses of a transducer as defined in claim 1, wherein said first means for generating a time period between adjacent pulses in a transducer signal includes an invertor.

17. A system for monitoring transducer signal pulses of a transducer as defined in claim 1, wherein said fourth means for comparing said average transducer pulse frequency with said actual transducer pulse frequency to diagnose intermittent problems with a transducer includes a comparator.

18. A process for monitoring transducer signal pulses of a transducer comprising the steps of:
   (a) generating a a time period between adjacent pulses in a transducer signal;
   (b) transforming said time period between adjacent pulses in transducer signal into an average transducer pulse frequency that represents transducer signal pulses for a period of time;
   (c) adding transducer signal pulses for said period of time to generate an actual transducer pulse frequency; and
   (d) comparing said average transducer pulse frequency with said actual transducer pulse frequency to diagnose intermittent problems with said transducer.

19. A process for monitoring transducer signal pulses of a transducer comprising the steps of:
   (a) generating a a time period between adjacent pulses in a transducer signal by means that includes a counter and a time based generator;
   (b) transforming said time period between adjacent pulses in a transducer signal into an average transducer pulse frequency that represents transducer signal pulses for a period of time;
   (c) adding transducer signal pulses for said period of time to generate an actual transducer pulse frequency; and
   (d) comparing said average transducer pulse frequency with said actual transducer pulse frequency to diagnose intermittent problems with said transducer.

20. A process for monitoring transducer signal pulses of a transducer comprising the steps of:
   (a) generating a a time period between adjacent pulses in a transducer signal;
   (b) transforming said time period between adjacent pulses in a transducer signal into an average transducer pulse frequency that represents transducer signal pulses for a period of time by means that include a look-up table;
   (c) adding transducer signal pulses for said period of time to generate an actual transducer pulse frequency; and
   (d) comparing said average transducer pulse frequency with said actual transducer pulse frequency to diagnose intermittent problems with said transducer.

21. A process for monitoring transducer signal pulses of a transducer comprising the steps of:
   (a) generating a a time period between adjacent pulses in a transducer signal;

(b) transforming said time period between adjacent pulses in a transducer signal into an average transducer pulse frequency that represents transducer signal pulses for a period of time;

(c) adding transducer signal pulses for said period of time to generate an actual transducer pulse frequency; and (d) comparing said average transducer pulse frequency with said actual transducer pulse frequency to diagnose intermittent problems with said transducer by means that include a comparator.

22. A process for monitoring transducer signal pulses of a transducer comprising the steps of:

(a) generating a a time period between adjacent pulses in a transducer signal;

(b) transforming said time period between adjacent pulses in a transducer signal into an average transducer pulse frequency that represents transducer signal pulses for a period of time;

(c) adding transducer signal pulses for said period of time to generate an actual transducer pulse frequency by means that include a clock and a counter; and (d) comparing said average transducer pulse frequency with said actual transducer pulse frequency to diagnose intermittent problems with said transducer.

23. A system for monitoring encoder signal pulses of an encoder comprising (a) a first means for generating a a time period between adjacent pulses in an encoder signal;

(b) a second means for transforming said time period between adjacent pulses in an encoder signal into an average encoder pulse frequency that represents encoder signal pulses for a period of time;

(c) a third means for adding encoder signal pulses for said period of time to generate an actual encoder pulse frequency; and (d) a fourth means for comparing said average encoder pulse frequency with said actual encoder pulse frequency to diagnose intermittent problems with said encoder.

24. A system for monitoring encoder signal pulses of an encoder as defined in claim 23, further comprising of a fifth means to electronically display the result of the comparison of said average encoder pulse frequency and said actual encoder pulse frequency.

25. A system for monitoring encoder signal pulses of an encoder as defined in claim 24, wherein said fifth means to electronically display the result of the comparison of said average encoder pulse frequency and said actual encoder pulse frequency includes a digital display interface and a digital display device.

26. A system for monitoring encoder signal pulses of an encoder as defined in claim 25, wherein said digital display device includes a cathode ray tube.

27. A system for monitoring encoder signal pulses of an encoder as defined in claim 25, wherein said digital display device includes a liquid crystal display.

28. A system for monitoring encoder signal pulses of an encoder as defined in claim 25, wherein said digital display device includes an electroluminiscent display.

29. A system for monitoring encoder signal pulses of an encoder as defined in claim 25, wherein said digital display device includes a plasma display.

30. A system for monitoring encoder signal pulses of an encoder as defined in claim 25, wherein said digital display device includes a light emitting diode.

31. A system for monitoring encoder signal pulses of an encoder as defined in claim 23, wherein said second means for transforming said time period between adjacent pulses in an encoder signal into an average encoder pulse frequency that represents encoder signal pulses for a period of time includes a look-up table.

32. A system for monitoring encoder signal pulses of an encoder as defined in claim 23, wherein said first means for generating a a time period between adjacent pulses in an encoder signal includes a counter.

33. A system for monitoring encoder signal pulses of an encoder as defined in claim 23, wherein said first means for generating a a time period between adjacent pulses in an encoder signal includes a time base generator.

34. A system for monitoring encoder signal pulses of a encoder as defined in claim 23, wherein said third means for adding encoder signal pulses for said period of time to generate an actual encoder pulse frequency includes a counter.

35. A system for monitoring encoder signal pulses of an encoder as defined in claim 23, wherein said third means for adding encoder signal pulses for said period of time to generate an actual encoder pulse frequency includes a clock.

36. A system for monitoring encoder signal pulses of an encoder as defined in claim 23, wherein said third means for adding encoder signal pulses for said period of time to generate an actual encoder pulse frequency includes a latch.

37. A system for monitoring encoder signal pulses of an encoder as defined in claim 23, wherein said first means for generating a time period between adjacent pulses in an encoder signal includes an AND gate.

38. A system for monitoring encoder signal pulses of an encoder as defined in claim 23, wherein said first means for generating a time period between adjacent pulses in an encoder signal includes an invertor.

39. A system for monitoring encoder signal pulses of an encoder as defined in claim 23, wherein said fourth means for comparing said average encoder pulse frequency with said actual encoder pulse frequency to diagnose intermittent problems with said encoder includes a comparator.

40. A process for monitoring encoder signal pulses of an encoder comprising the steps of:

(a) generating a a time period between adjacent pulses in an encoder signal;

(b) transforming said time period between adjacent pulses in an encoder signal into an average encoder pulse frequency that represents encoder signal pulses for a period of time;

(c) adding encoder signal pulses for said period of time to generate an actual encoder pulse frequency; and (d) comparing said average encoder pulse frequency with said actual encoder pulse frequency to diagnose intermittent problems with said encoder.

41. A process for monitoring encoder signal pulses of an encoder comprising the steps of:

(a) generating a a time period between adjacent pulses in an encoder signal by means that includes a counter and a time based generator;

(b) transforming said time period between adjacent pulses in an encoder signal into an average encoder pulse frequency that represents encoder signal pulses for a period of time;

(c) adding encoder signal pulses for said period of time to generate an actual encoder pulse frequency; and (d) comparing said average encoder pulse frequency with said actual encoder pulse frequency to diagnose intermittent problems with said encoder.

42. A process for monitoring encoder signal pulses of an encoder comprising the steps of:
(a) generating a a time period between adjacent pulses in an encoder signal;
(b) transforming said time period between adjacent pulses in an encoder signal into an average encoder pulse frequency that represents encoder signal pulses for a period of time by means that include a look-up table;
(c) adding encoder signal pulses for said period of time to generate an actual encoder pulse frequency; and
(d) comparing said average encoder pulse frequency with said actual encoder pulse frequency to diagnose intermittent problems with said encoder.

43. A process for monitoring encoder signal pulses of an encoder comprising the steps of:
(a) generating a a time period between adjacent pulses in an encoder signal;
(b) transforming said time period between adjacent pulses in an encoder signal into an average encoder pulse frequency that represents encoder signal pulses for a period of time;
(c) adding encoder signal pulses for said period of time to generate an actual encoder pulse frequency; and
(d) comparing said average encoder pulse frequency with said actual encoder pulse frequency to diagnose intermittent problems with said encoder by means that include a comparator.

44. A process for monitoring encoder signal pulses of an encoder comprising the steps of:
(a) generating a a time period between adjacent pulses in an encoder signal;
(b) transforming said time period between adjacent pulses in an encoder signal into an average encoder pulse frequency that represents encoder signal pulses for a period of time;
(c) adding encoder signal pulses for said period of time to generate an actual encoder pulse frequency by means that include a clock and a counter; and
(d) comparing said average encoder pulse frequency with said actual encoder pulse frequency to diagnose intermittent problems with said encoder.

* * * * *